A. J. H. OXFORD
Inventor
By Mason and Hall
Attorneys

A. J. H. OXFORD
Inventor
By Moore and Hall
Attorneys

A.J.H. Oxford
Inventor
By Moore and Hall
Attorneys

A. J. H. OXFORD
Inventor
By Moore and Hall
Attorneys

A. J. H. OXFORD
Inventor
By Morris and Hale
Attorneys

Patented Apr. 8, 1952

2,592,061

UNITED STATES PATENT OFFICE 2,592,061

COMMUNICATION SYSTEM EMPLOYING PULSE CODE MODULATION

Alan John Henry Oxford, Christchurch, England

Application March 14, 1949, Serial No. 81,235
In Great Britain March 25, 1948

15 Claims. (Cl. 179—5.6)

This invention relates to circuits for generating code signals representing a number or magnitude by a series of signals in one of two states (e. g. mark or space) which characterise the number in the binary system of notation.

For example if the number is 41, which is 101001 in the binary system of notation, the code signal generated may be mark, space, mark, space, space, mark.

Such code signals are of use in systems of telecommunication in which the amplitude of a complex wave is determined at a given instant and a code signal representing this amplitude to a given degree of accuracy is transmitted. Preferably in such a system the complex wave undergoes amplitude compression before being transformed into a code signal.

Binary code signals for numbers are also used in certain electronic digital computors.

The present invention comprises in one aspect a method of deriving a code signal representing, in the binary system of notation, the magnitude of a given electric potential which includes the steps of generating a series of potentials in which the differences between consecutive potentials form a geometric progression with a common ratio of one half, comparing the said given potential with the first potential in said series and as a result of such comparison generating a unit code signal of a first or second kind (e. g. a mark or a space) and at the same time decreasing or increasing the said given potential by the second potential in said series according to whether the said given potential is respectively greater or less than the said first potential, carrying out a similar process with the said first potential and the given potential as modified but this time modifying the modified given potential with the third potential in said series and continuing similar processes with the other potentials in said series until the required code signal is derived.

It will be clear that this method may be slightly modified by increasing (or decreasing) the said first potential by the said second potential instead of decreasing (or increasing) the given potential after the first comparison and then comparing the modified first potential with the unchanged given potential. The general principle is that one of the compared potentials is changed by steps which are in geometrical progression and the direction of the change is positive if the unchanged potential was greater at the previous comparison and vice versa.

The underlying principle of the invention and the means for carrying it into effect will become clearer from the following description of a practical embodiment made with reference to the attached drawings which show, by way of example, the application of the invention to a system of telecommunication.

Figure 1:
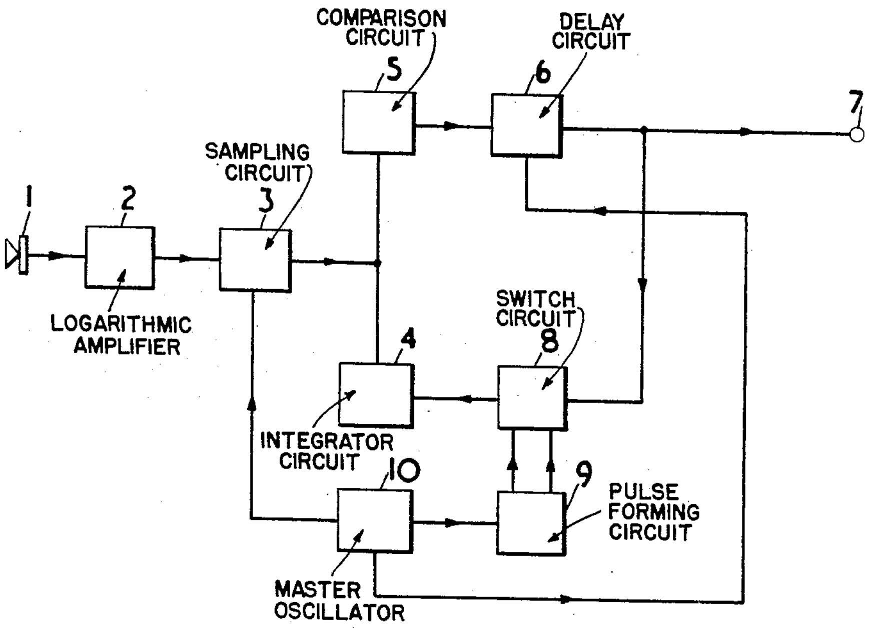
Fig. 1 is a block schematic diagram of a transmitter modulator according to the invention.
Figure 2:
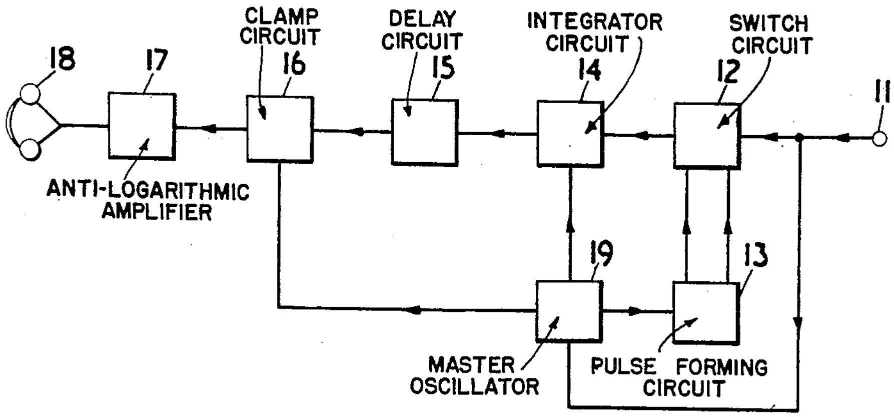
Fig. 2 is a block schematic diagram of a receiving demodulator for receiving signals modulated by a modulator according to Figure 1.
Figure 3:
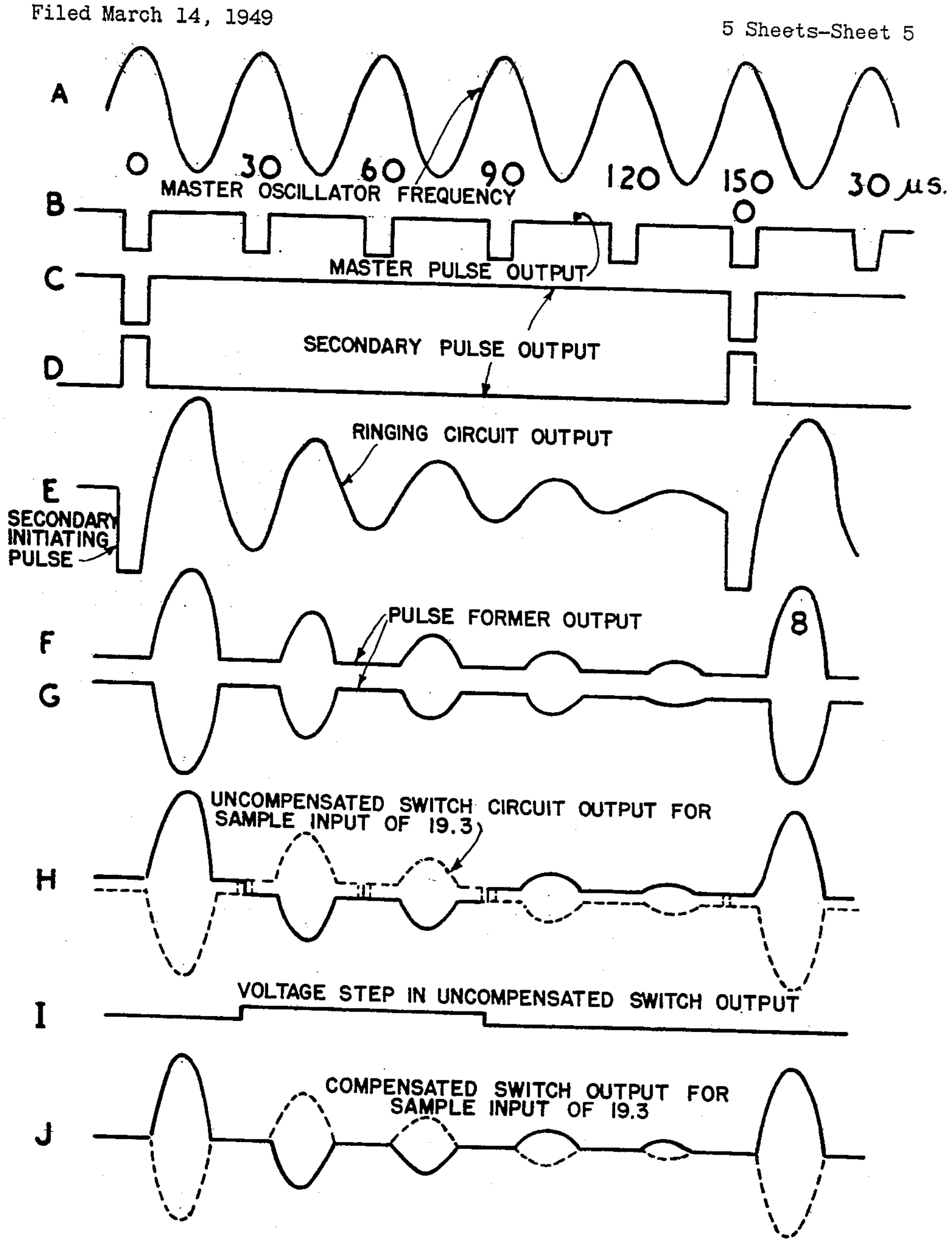

Referring first to Figure 1, speech signals from a microphone 1 are applied through a logarithmic amplifier 2 to a circuit 3, hereinafter referred to as a sampling circuit, which in turn applies to an integrator circuit 4, a voltage representing the instantaneous amplitude of the speech waveform derived from the microphone 1 after amplification. The voltage from the integrator 4 is applied to a comparison circuit 5 which serves to determine the level of the instantaneous amplitude voltage derived from integrator 4 in relation to a fixed datum level. According to whether the voltage applied to the comparison 5 from the integrator 4 lies above or below the datum level, a pulse is or is not applied through the delay circuit 6 to the output of the modulator at terminal 7. When a pulse is transmitted from the delay circuit 6 it is also applied to a switch circuit 8, which serves to select pulses of one sign or the other from a pulse forming circuit 9 and to apply them to the integrator 4 to modify the voltage set up therein by the sampling circuit 3 or remaining there after previous modifications have taken place. The pulse forming circuit 9 is controlled by a master oscillator 10 which also supplies control pulses to the clamp circuit 3 and code pulses for transmission, to the delay circuit 6.

Figure 3:
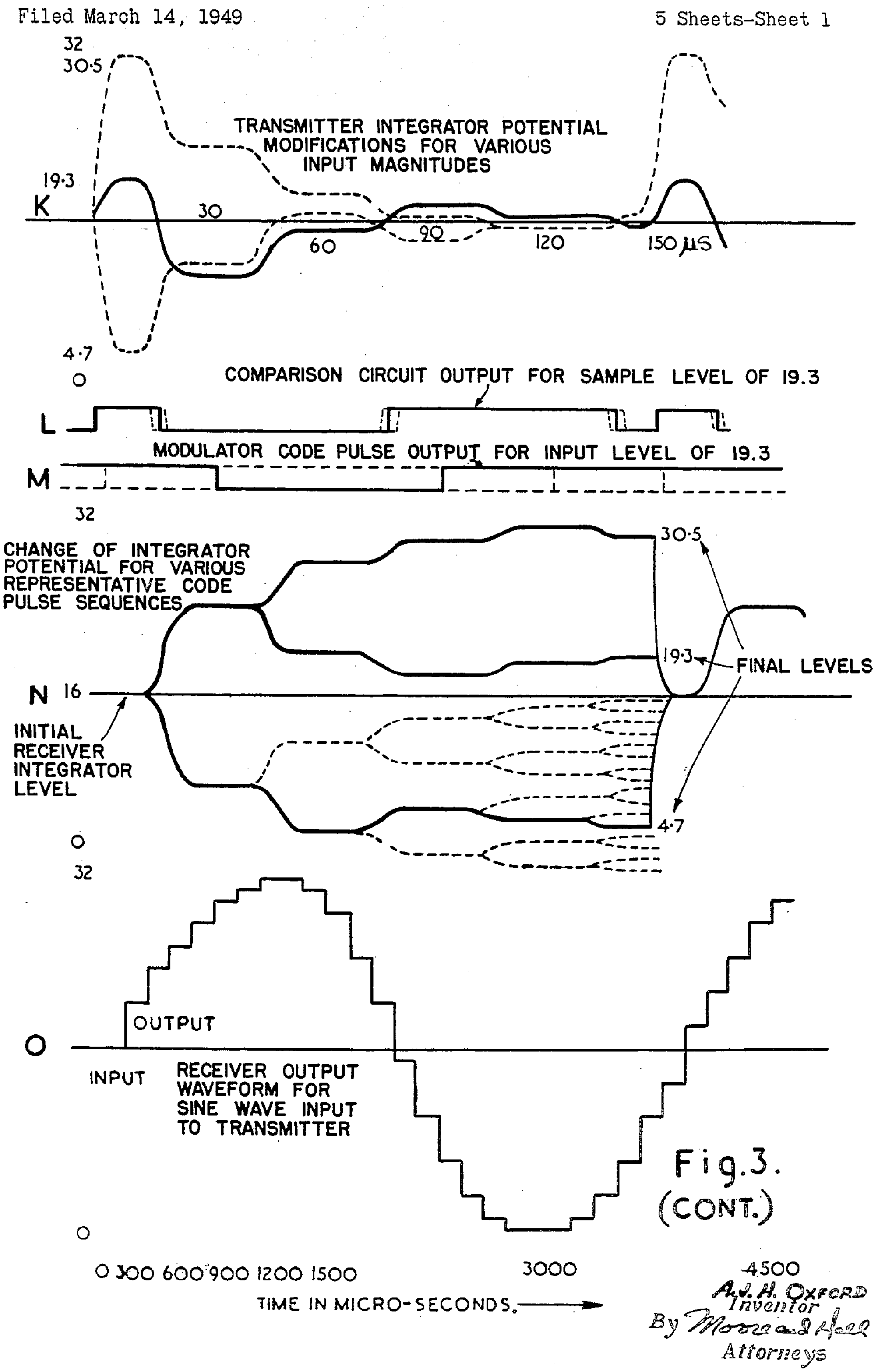
Fig. 3 is a series of diagrams showing the waveforms existing in parts of the circuits of Figures 1 and 2.

The operation of this circuit will be more fully understood by reference to the waveform diagram of Figure 3. In this figure, curve A represents the master oscillator frequency generated in oscillator 10. At each positive peak of this oscillation a master pulse is generated, as shown in curve B. A multivibrator controlled by these master pulses generates positive and negative-going secondary pulses shown in curves C and D, coinciding with each fifth pulse of the master pulse series. Secondary pulses are applied from master oscillator 10 to the sampling circuit 3 and serve to operate the sampling circuit 3 so as to apply the desired sample voltage, representative of the instantaneous amplitude of the speech signal, to the integrator 4. Simultaneously a secondary pulse is applied from master oscillator 10 to the pulse forming circuit 9. The pulse forming circuit 9, which will be described in more detail below, provides two outputs, one positive-going and the other negative-going, curves F and G, each output comprising a damped train of pulses occurring at the same frequency as the master pulses, but timed to occur during intervals between the master pulses. These damped trains of pulses have a decrement of two, in the present example, for a reason which will be made apparent later. According to the condition of switch 8, one or other of the two outputs from pulse former 9 is applied to the integrator 4. According to which output from pulse former 9 is selected, the sample voltage set up in integrator 4 and representative of the instantaneous amplitude of the speech wave, will be increased or decreased by a specific amount.

The switch 8, as above described, is controlled by the code pulses sent out from the modulator. The presence or absence of a pulse in the output circuit is determined by the level of the voltage in the integrator 4 in relation to a datum voltage level, the comparison being effected in comparison circuit 5. Thus, if the voltage in integrator 4 is above the datum level a pulse is transmitted. This pulse ensures that the switch 8 is in such a condition that a negative pulse from pulse former 9 is applied to the integrator 4 so that the voltage in the integrator is reduced by a specific amount. If on the other hand the voltage in the integrator 4 is below the datum level, no pulse is passed to the output circuit and it is arranged that in these circumstances the switch 8 assumes the condition in which a positive pulse from 9 is applied to the integrator. It will thus be seen that the difference between the remaining voltage in the integrator 4 and the datum voltage level will be progressively decreased.

The accompanying waveform diagrams of Figure 3, curves H to M, have been drawn on the assumption that the sample voltage applied to integrator 4 from sampling circuit 3 corresponds to the value 19.3 on the scale of 32 voltage levels on which the system is to work. Since the voltage level is above the datum level, that is the centre level (level 16) the comparison circuit 5 will detect this fact and ensure that a pulse from master oscillator 10 is released through the delay circuit 6 and passed on for transmission. This transmitted pulse applied to switch 8 ensures the selection of the first pulse of the negative-going output from pulse former 9 for application to the integrator 4, this pulse being of a magnitude sufficient to reduce the voltage on the integrator 4 by an amount equivalent to 8 levels on the scale of 32 levels. The voltage level in integrator 4 is thus reduced to a voltage level of 11.3 and is now, therefore, below the datum or half-way level (level 16). The comparison circuit 5 therefore operates to suppress the next pulse from master oscillator 10, so that no pulse is transmitted for this voltage level. Switch 8, on the other hand, now assumes the condition in which it applies the second pulse of the positive-going train from pulse former 9 to the integrator 4. The magnitude of this pulse is such that the integrator voltage is raised through 4 levels so that it now becomes 15.3 and is still below the datum level. The next pulse from master oscillator 10 is therefore again suppressed and no pulse is transmitted. Switch 8, therefore, remains in condition to select the negative output from pulse former 9 and apply the third pulse of the positive-going pulse train to the integrator 4. The magnitude of this pulse is such as to change the voltage on integrator 4 through two levels and bring it now to a voltage level of 17.3. It is now above the datum level (level 16) so that comparison circuit 5 now determines that the next pulse from master oscillator 10 shall be transmitted. The pulse reverses the switch 8 so that the next pulse applied to integrator 4 is the fourth negative-going pulse from pulse former 9; this pulse substracts one voltage level from the integrator 4, bringing it to level 16.3. This the final pulse of the series is transmitted, the switch 8 is retained in the position in which it selects the negative-going output from pulse former 9 and the last negative pulse changes the voltage level of the integrator 4 by one half of a level.

It will now be seen that for the given sample voltage extracted by the sampling circuit 3 from the speech waveform and corresponding to reference level 19.3, a code series has been transmitted comprising the first, fourth and fifth pulses of a code train, the second and third pulses being absent. The waveforms of the output from the comparison circuit 5 and the final code pulse output of the modulator are shown at Figs. 3 (L) and (M). The integrator 4 is now ready to receive the next sample voltage from sampling circuit 3 and it will be seen from inspection of curves D and E that the next secondary pulse now arrives in time to operate the sampling circuit 3, set up a new "sample" voltage in the integrator 4 and initiate a new train of positive-and negative-going pulses from the pulse former 9.

Dotted curves on Figure 3 (K) show the voltage changes taking place when voltage level of 4.7 and 30.5 are set up in the integrator.

The arrangement at the receiver follows a similar plan to that above described for the transmitter. Incoming code pulses are applied from terminal 11 to a switch unit 12, similar to the switch unit 8 of the transmitter. The incoming pulse will have an underlying repetition frequency, that is to say a repetition frequency equal to that of the pulse shown at B in Fig. 3 and generated at the transmitter. The received pulse will not normally form a complete periodic series because the complex wave to be transmitted will not be continuously at maximum amplitude. The switch unit 12 receives positive-and negative-going damped trains of pulses from pulse former 13 and selects pulses of the approprite sign and magnitude, in accordance with the received code pulses, for application to an integrator 14, in which a voltage representing the instantaneous amplitude of the speech wave corresponding to the code pulses is to be built up. At the end of each group of code pulses the final integrator voltage is released through the delay circuit 15 and a clamp circuit 16 to an anti-logarithmic amplifier 17 from which the audio output for the head phones 18 is obtained.

Synchronism between the receiver and the transmitter is maintained by the receiver master oscillator 19 which receives the incoming code pulses from terminal 11. The master oscillator 19 supplies controlling pulses to pulse former 13 to initiate each train of positive-and negative-going pulses. It also supplies pulses to the integrator 14 at the appropriate times to discharge the integrator to the datum voltage level. Pulses from the oscillator 19 are also applied to the clamp circuit 16, a valve circuit of the same configuration as that of sampling circuit 3 of the transmitter, to release from the delay circuit 15 the final amplitude-level voltage from the integrator 14 and pass it on to the amplifier 17.

The manner in which the integrator voltage is built up is illustrated in Figure 3 (N) taking as example the amplitude level of 19.3 used in describing the transmitter operation. The sequence of events in the receiver integrator 14 is as follows: the presence of the first code pulse of the series raises the integrator voltage from its starting voltage (the datum level, level 16) through 8 levels to level 24. The absence of the second and third code pulses of the series causes switch 12 to select the negative-going pulses from pulse former 13 and these two pulses reduce the integrator voltage by four and two levels respectively, so that the level 18 is reached. The fourth pulse of the code pulse series is present and operates switch 12 to cause the fourth positive-going pulse to be supplied to the integrator 14, thus raising the integrator voltage through one level to level 19. Finally the fifth pulse is also present so that the integrator voltage is raised by the fifth positive-going pulse from pulse former 13 through an additional one-half level. The final voltage on the integrator 14 is, therefore, 19.5 levels, which is the nearest approximation to the correct level of 19.3. In the same way the levels of 4.7 and 30.5 referred to in the transmitter description may be built up by the steps shown in Figure 3 (N) and correspondingly marked. The dotted outlines in Figure 3 (N) show the various possible excursions of the integrator voltage for the lower amplitude levels up to level 16.

As each integrator final voltage is reached and read off by the clamp circuit 16 a stepped waveform is built up in the amplifier 17 in the manner illustrated at Figure 3 (O) for a sign wave input. It will be appreciated, of course, that the curve of Figure 3 (O) is drawn to a different time scale from that used for the remaining figures, each step of the curve corresponding to a separate series of code pulses.

Figure 4:
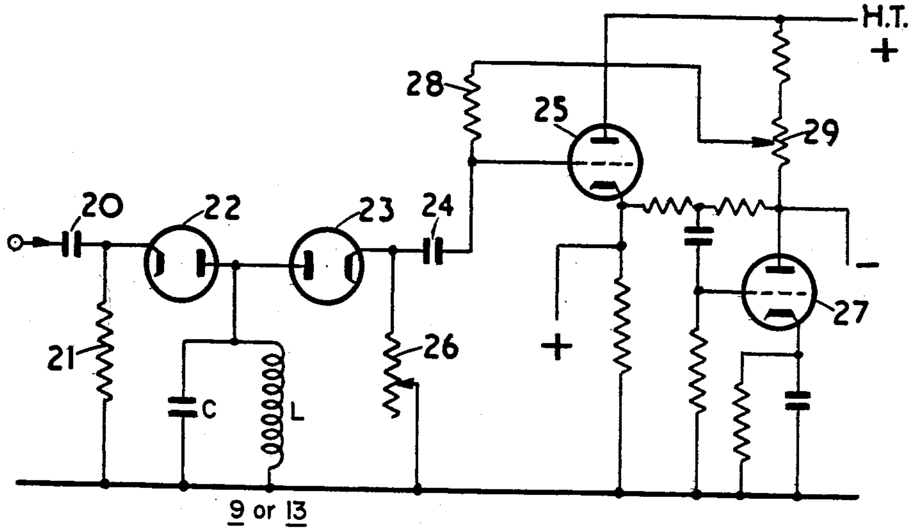
Fig. 4 is a circuit diagram of a part of the modulator shown diagrammatically in Figure 1.

Figure 4 is a simplified circuit diagram for a pulse former 9 or 13 for either a transmitter or a receiver of the kind above described. This circuit comprises a ringing circuit consisting of a capacity C and inductance L in parallel, tuned to the frequency required for the code pulses. This circuit is rung by pulses from the master oscillator 10 or 19 which are applied thereto through an input circuit comprising condenser 20, resistor 21 and diode 22. Oscillations from the ringing circuit of the waveform shown at Fig. 3 (E) are applied through a further diode 23 and coupling condenser 24 to the grid of a valve 25. The correct decrement for the oscillations of circuit LC is ensured by adjustment of the variable resistor 26. Valve 25 is connected in a "see saw" circuit with a further valve 27. From this circuit-positive-and negative-going pulses, coincident in time and equal in amplitude, may be obtained from the cathode of valve 25 and the anode of valve 27 respectively. In order to obtain the correct D. C. level for these pulses the grid of valve 25 is connected through resistor 28 to a point on the anode load resistor 29 of valve 27. Since the cathode load of valve 25 is not decoupled this valve operates as a cathode follower so that its cathode, from which the positive-going output obtained, is raised to a voltage approximating to that of the grid and, therefore, to that of the anode of valve 27. In this way the two outputs from the circuit are maintained at substantially the same D. C. level.

Figure 5:
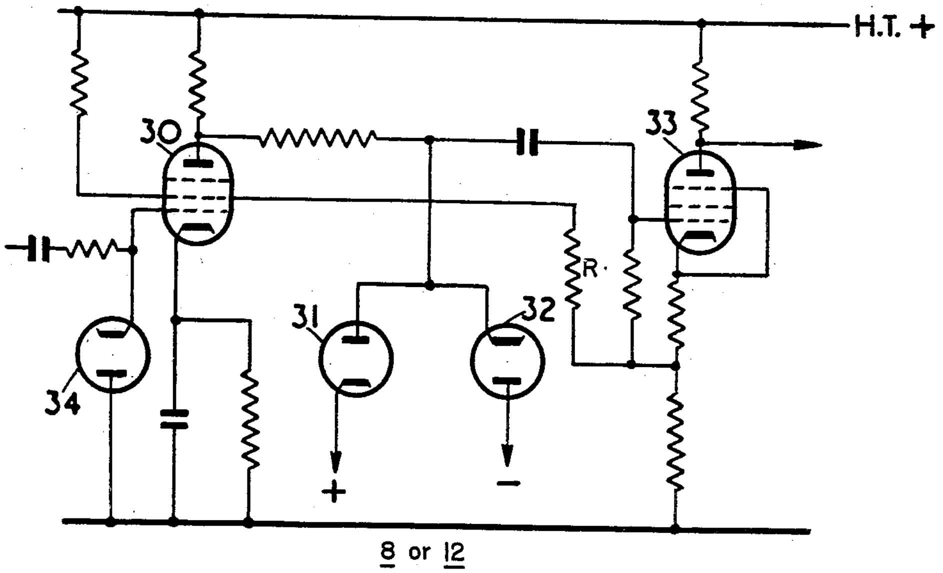
Fig. 5 is a circuit diagram of a further part of the transmitter modulator.

The circuit diagram of Figure 5 is, in simplified form, that of the switch 8 or 12. The pentode valve 30 has applied to its grid, switching pulses which may be either the modulator code pulses or the received code pulses. According to whether a pulse is or is not present on the grid of valve 30, the anode of this valve will be at a high or low voltage to render one or other of the two diodes 31, 32 conductive. The positive-and negative-going pulses from the circuit of Figure 4 are introduced through these diodes 31 and 32. According to which of these two diodes is rendered conductive, therefore, either a positive-going pulse or a negative-going pulse will be applied to the grid of a further valve 33, from which the selected pulses is passed on to the integrator 4 or 14.

It will be seen that the screen grid of valve 30 is connected through a resistor R to a point in the cathode circuit of valve 33. The purpose of this resistor is to apply compensation to the output pulses from valve 33 to ensure that the pulses passed on to the integrator start from the same voltage level. Since a finite operating voltage is required for the comparison circuit 5, in the absence of resistor R, a voltage step would be produced in the pulse output as shown in Figure 3 (H). Since the valve 30 changes from a conducting to a non-conducting condition whenever the absence of code pulses gives place to the presence of a code pulse, and vice versa, the screen voltage of valve 30 will correspondingly change and this change is communicated through resistor R to the grid-cathode circuit of valve 33 to effect the necessary voltage compensation on the anode of this valve. The voltage step thus brought about in the case of a group of code pulses corresponding to the example quoted above, that is level 19.3, is shown at Figure 3 (I). The compensated output for the same example is shown in Figure 3 (J). The diode 34 in the grid circuit of valve 30 ensures that the proper D. C. level for the grid of this valve is maintained whatever code pulses are present or absent in the input circuit of this valve.

Figure 6:
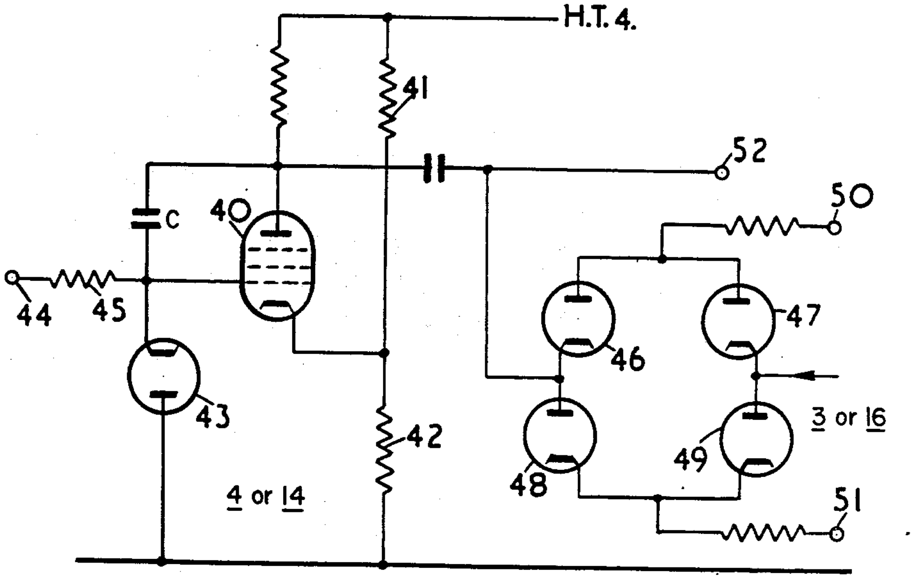
Fig. 6 is another circuit diagram of yet another part of the modulator shown in Figure 1.

The compensated pulses from the switch circuit of Figure 5 are applied in the case of the transmitter to an integrator and diode clamp circuit of the form illustrated in Figure 6. This circuit comprises a valve 40 connected as a Miller integrator. The voltage on the cathode of this valve is fixed by a potentiometer chain comprising resistor 41 and 42. The correct D. C. level for its grid voltage is maintained by means of diode 43. The compensated pulses from the switch are applied to its grid via terminal 44 and series resistor 45. The integrating capacity is provided by condenser C connected between the anode and grid of this valve. The initial or sample voltage is applied to the integrator 4 from the logarithmic amplifier 2 through a diode clamp comprising four diodes 46, 47, 48 and 49 connected in pairs as shown. The diodes are rendered conductive at the appropriate times by the application thereto, through terminals 50, 51 of the positive and negative-going secondary pulses from the multivibrator of the oscillator 10. When these diodes are rendered conductive the voltage existing at that instant in the output from the logarithmic amplifier 2 is transferred into the integrating capacity C and is applied simultaneously through terminal 52 to the comparison circuit 5. As soon as the secondary pulses terminate, the diodes 46 to 49 cease to conduct. The voltage remaining in the condenser C is the desired sample voltage. Its value is then modified successively by the pulses applied to the grid of the valve through terminal 44 from the switch circuit 8 . The changes in this voltage are taken from terminal 52 to the comparison circuit which is not shown or described in detail, since it may be of any form well known in the art, it being required only to discriminate between voltages above or below the fixed level.

Figure 7:
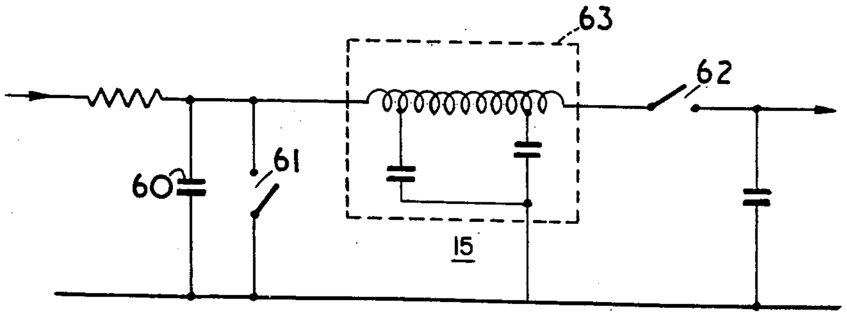
Fig. 7 is a diagrammatic representation of the delay and output circuits of the receiver demodulator.

The integrator delay and clamp circuits 14, 15 and 16 in the receiver are illustrated diagrammatically in Figure 7. The positive- and negative-going pulses from switch 12 are integrated in the condenser 60 which is arranged to be discharged at the conclusion of each code pulse series by a device shown in this diagram as a switch, but which in practice will be, of course, a valve—for example a diode operated in any suitable known manner under control of the secondary pulses from oscillator 19. A further switch 62, which may also be constituted by a diode, applies the output from a delay line 63 to the anti-logarithmic amplifier 17. The switches 61 and 62 are operated simultaneously so that the result of the integration, stored in the delay line, is applied to the anti-logarithmic amplifier 17 during the discharge of the integrator 14.

Reference has been made above to the logarithmic amplifier 2 and an anti-logarithmic amplifier 17 in the transmitter and receiver respectively. The logarithmic amplifier 2 in the transmitter has a gain characteristic which decreases with amplitude logarithmically and therefore has the effect of compressing the amplitude of the signal according to a logarithmic law. The signal being thus compressed, the 32 levels of amplitude from which the signal wave is finally built up in the receiver, in effect are logarithmically distributed. That is to say, although 32 levels are in fact uniform voltage steps, the highest and lowest levels correspond to original signal amplitudes more widely removed from the zero or datum level than their numerical values represent. The compression is compensated for in the receiver by the anti-logarithmic amplifier 17. The gain of which increases logarithmically with amplitude according to a law which is the inverse of that governing the amplifier 2 in the transmitter.

In the embodiment described above the code signal was derived from the given sample signal by storing the sample signal and comparing it with a fixed potential (level 16) and increasing (or decreasing) the stored sample signal at each comparison. It will be appreciated that this fixed potential (level 16) in this embodiment constitutes the first potential in the series of potentials referred to above and in the appended claims. Now, as adumbrated above, instead of keeping this first potential constant the sample signal may be kept constant and the first potential varied. The necessary circuit changes will be obvious to a person skilled in this art who has followed the description given above. Thus the first potential will be stored in an integrator and the sample signal used to bias a comparison circuit.

I claim:

1. Apparatus for deriving a code signal representing in the binary system of notation the magnitude of a given electric potential and comprising a source of reference potential, a comparison circuit coupled to said source of reference potential and to said given potential, said comparison circuit detecting; the sign of the given potential relative to that of said reference potential and producing a code pulse having one of two states depending upon the result of the detection, a circuit for generating a train of reference potentials decreasing in geometric progression with a common ratio of one half, means coupled to the output of the said comparison circuit for injecting, in response to said output reference pulses in the appropriate sense into the said comparison circuit to modify one of the potentials fed thereto and to convert this modified potential into a potential varying in amplitude step-by-step, the last named means including means coupled to said comparison circuit and controlling it to effect at each step a detection of sign to produce a code pulse of appropriate state and to change the level of the said modified potential by the next occurring reference pulse in the positive direction if the level of the modified potential was negative with respect to the unmodified potential or vice versa.

2. Apparatus for deriving code signals representing in the binary system of notation the magnitudes of a series of given electric potentials and comprising a circuit for presenting said given potentials at a first frequency to a storage device, means for generating two damped trains of electric pulses when a given potential is presented to said storage device, the pulses in each of said trains having a decrement of two and the same recurrence frequency which is an integral multiple of the said first frequency but one train being of positive polarity and the other of negative polarity, a comparison circuit for comparing the potential in said storage device with a predetermined potential, and means for generating a unit code signal in one or other of two states and at the same time applying to said storage device a negative or a positive pulse from one or the other of said trains according to whether the potential in said storage device is respectively greater or less than said predetermined potential the foregoing elements in combination including connecting means for repeating this process with the succeeding pulses until a complete code signal is generated and then repeating the whole process for the next given potential.

3. In a telephone system for voice transmission and reception, a microphone for the conversion of voice vibrations into a complex potential wave, an earphone, transmitter means coupled to said microphone, said transmitter means including means deriving a code signal in which the magnitudes of successive ordinates of said voice potential wave are in the form of pulse sequences representative of the binary system of notation, receiver means coupled to said earphones and reinterpreting a given pulse sequence as its representative voice wave form ordinate, said receiver means comprising all of the following parts, an input for the reception of code units of two states from said transmitter means, means for producing a pulse sequence of predetermined repetition rate, a source of decaying potential initiated by said pulsing means in which the differences of level between successive predetermined steps of the decay form a geometric progression having a common ratio of one-half, a switching circuit coupled to said incoming pulses, said switching means including control means actuated by said pulses to select one polarity of the decaying potential in response to one state of code unit or the opposite polarity of the decaying potential in response to the second state of code unit, means for producing a reference potential, an integrating circuit wherein said reference potential is successively modified by said source of decaying potential through the medium of said switching circuit in response to the states and sequence of code pulse reception, an output, valve means connecting said integrator circuit to said output upon the conclusion of a given code sequence, valve means for discharging said integrator circuit to return it to its initial state at the conclusion of reception of a given code sequence preparatory to the reception of succeeding code sequences, and means connecting said output to said earphones for the excitation of the latter and reproduction of the original voice wave.

4. In a telephone system for voice transmission and reception, a microphone for the conversion of voice vibrations into a complex potential wave, an earphone, transmitter means for converting said complex wave into a series of code pulses having an amplifier connected to the microphone, a sampling circuit for taking successive instantaneous magnitudes of said voice potential wave, a source of reference potential comparison means coupled to said source of reference potential and to said sampling circuit for comparing a given instantaneous amplitude of said voice wave with said reference potential, means for producing a sequence of pulses of predetermined repetition rate, a source of periodically decaying potential initiated at predetermined intervals by said pulsing means, a switching circuit for selecting a desired polarity of one of the two senses of said decaying potential, an integrator circuit wherein said instantaneous voice potential magnitude is successively modified by the output of said switching circuit toward said reference level in response to the aforementioned comparison, an output, valve means coupled to the output of the comparison means for determining which pulses of said sequence of pulses are to be transmitted, and means connecting said output to said switching circuit whereby said switching circuit selects the desired polarity of said decaying potential in response to said output.

5. In a system of telecommunication in which the instantaneous amplitude of a complex wave is to be interpreted and transmitted by a sequence of code pulses, means for producing a sequence of pulses of a predetermined frequency, valve means for determining which pulses of a given group of said sequence of pulses are to be transmitted, an input, a source of reference potential, means coupled to said input and to said source of reference potential to compare said input potential with said reference potential, an integrator circuit wherein said input potential is successively increased or diminished in response to said comparison, means for producing two decaying potentials of two polarities respectively at predetermined intervals, a switching circuit, means controlling said switching circuit in response to the aforementioned comparison, means connecting the output of said switching circuit with said integrator circuit for the successive alteration of the input potential in response to said comparsion, and means controlling the aforementioned valve in response to successive comparisons.

6. In a system of communication in which the instantaneous magnitude of a varying electrical quantity is to be interpreted and transmitted by a code sequence of pulses, an input, a source of reference potential, means coupled to said input and to said source of reference potential for comparing said input with said reference potential, a source of periodically decaying potential of two possible polarity senses, integrator means for altering said input potential at periodic intervals in response to said comparison, switching means controlled by the results of said comparison for connecting the proper polarity sense of said source of decaying potential to said integrator means to modify said input toward the reference value, means for producing a sequence of pulses of a predetermined repetition rate, valve means for determining which pulses of said sequence are to be transmitted, said valve means being controlled in a predetermined manner by the results of the aforementioned comparison.

7. In a system of communication in which the instantaneous magnitude of a varying electrical quantity is to be interpreted and transmitted by a code sequence of pulses, a transmitter having an input, a source of reference potential comparison means coupled to said source of reference potential and to said input for comparing said input with said reference potential, a source of periodically decaying potential, a switching circuit for selecting a desired polarity of two possible senses of said decaying potential, an integrator circuit wherein said input is successively modified by said decaying potential toward said reference level, means for producing a sequence of pulses of predetermined repetition rate for possible transmission and for initiating the action of said input and said source of decaying potential, an output, valve means connected to and operated by the output of said comparison means for determining which pulses of said sequence of pulses are transmitted, said switching circuit including means controlled by said output to modify said input toward said reference level.

8. In a system of communication in which the instantaneous magnitude of a varying electrical quantity is to be interpreted and transmitted by a code sequence of pulses, a transmitter having an input, a source of reference potential comparison means coupled to said source of reference potential and to said input for comparing said input with said reference potential, means for producing a sequence of pulses of predetermined repetition rate, a source of periodically decaying potential initiated at predetermined intervals by said pulsing means, a switching circuit for selecting a desired polarity of one of the two senses of said decaying potential, an integrater circuit wherein said input is successively modified by the output of said switching circuit toward said reference level in response to the aforementioned comparison, an output, valve means including control means responsive to the output of the comparison means for determining which pulses of said sequence of pulses are to be transmitted, and means connecting said output to said switching circuit whereby said switching circuit selects the desired polarity of said decaying potential in response to said output.

9. In a system of communication in which the instantaneous magnitude of a varying electrical quantity is to be interpreted and transmitted by a coded sequence of pulses, an input, a source of reference potential means coupled to said input and to said source of reference potential for effecting a first comparison between said input and said reference potential and for effecting a series of subsequent comparisons between one of said potentials and a potential changing step-by-step in one or the other direction at each comparison and derived from the other of said potentials, means for producing a sequence of pulses of predetermined repetition rate, a source of periodically decaying potential in which the differences of level between successive steps of the decay form a geometric progression having a common ratio of one-half, a switching circuit for selecting a desired polarity of said decaying potential at predetermined intervals in said decay in response to said comparison, an integrator circuit wherein said input is successively modified by the decaying potential through the medium of the switching circuit, said switching circuit having means to effect such modification in a positive direction if the relative sign of the unchanged potential was positive at the previous comparison and vice versa, an output, and valve means excited by said pulsing means and including control means actuated by said comparison circuit for determining which units of said sequence of pulses are to be transmitted, said switching means including control means actuated by said output to control the direction of change of level of the modified input in response to the preceding code unit in the output.

10. In a system of communication, transmitter means for deriving a code signal in which the magnitudes of successive ordinates of a complex wave are in the form of pulse sequences representative of the binary system of notation, apparatus for reinterpreting a given pulse sequence as its representative complex wave-form-ordinate comprising an input for the reception of code units of two states from said transmitter means, means for producing a pulse sequence of predetermined repetition rate, a source of decaying potential periodically initiated by said pulsing means, a switching circuit for selecting a desired polarity of said decaying potential responsive to said sequence of code units, means for producing a reference potential, an integrating circuit wherein said reference potential is successively modified by said source of decaying potential through the medium of said switching circuit, an output, means connecting said integrator circuit to said output upon the conclusion of a given code sequence, and means for returning the integrator circuit to its initial state at the conclusion of reception of a given code sequence preparatory to the reception of succeeding code sequences.

11. In a system of communication, transmitter means for deriving a code signal in which the magnitudes of successive ordinates of a complex wave are in the form of pulse sequences representative of the binary system of notation, apparatus for reinterpreting a given pulse sequence as its representative complex-wave-form ordinate comprising all of the following parts, an input for the reception of code units of two states from said transmitter means, means for producing a pulse sequence of predetermined repetition rate, a source of decaying potential initiated by said pulsing means in which the differences of level between successive predetermined steps of the decay form a geometric progression having a common ratio of one-half, a switching circuit coupled to said input pulses, said switching circuit including control means actuated by said incoming pulses to select one polarity of the decaying potential in response to one state of code unit or the opposite polarity of the decaying potential in response to the second state of code unit, means for producing a reference potential, an integrating circuit wherein said reference potential is successivelly modified by said source of decaying potential through the medium of said switching circuit in response to the states and sequence of code pulse reception, an output, means connecting said integrator circuit to said output upon the conclusion of a given code sequence, and means for returning the integrator circuit to its initial state at the conclusion of reception of a given code sequence preparatory to the reception of succeeding code sequences.

12. In a system of communication in which the instantaneous magnitude of a varying electrical quantity is represented in the binary system of notation by a code sequence of pulses of two states, a receiver for demodulating said code sequence of pulses to produce an instantaneous magnitude of potential output comprising all of the following parts: an input, means for producing a pulse sequence of predetermined repetition rate, a source of decaying potential in which the differences of level between successive predetermined steps of the decay form a geometric progression having a common ratio of one-half, a switching circuit coupled to said input pulses, said switching circuit including control means actuated by said incoming pulses to pass one polarity of the decaying potential in response to one state of code unit or the opposite polarity of the decaying potential in response to the second state of code unit, means for producing a reference potential, an integrating circuit wherein said reference potential is successively modified by said source of decaying potential through the medium of said switching circuit, an output, means connecting said integrator circuit to said output upon the conclusion of a given code sequence, and means for returning the integrator circuit to its initial state at the conclusion of reception of a given code sequence preparatory to the reception and demodulation of succeeding code sequences.

13. In a system of communication in which the instantaneous magnitude of a varying electrical quantity is represented in the binary system of notation by a code sequence of pulses of two states, a receiver for demodulating said code sequence of pulses to produce an instantaneous magnitude of potential output comprising an input, means for producing a pulse sequence of predetermined repetition rate, a source of periodically decaying potential of two polarities in which the differences of level between successive steps of the decay form a geometric progression having a common ratio of one-half, a switching circuit including means to select one polarity of the decaying potential in response to one state of code unit or the opposite polarity of the decaying potential in response to the second state of code unit, means for producing a reference potential, an integrating circuit wherein said reference potential is successively modified by said source of decaying potential through the medium of said switching circuit, a delay circuit in which the final potential of said modified potential of said integrating circuit for a given demodulated code sequence is stored, an output, valve means connecting said delay circuit to said output upon the conclusion of a given code sequence, and valve means for discharging said integrator to restore it to its initial state upon the conclusion of reception of a given code sequence preparatory to the reception and demodulation of succeeding code sequences.

14. In an indicating system, output control means, storage means, generator means for producing a decaying current, means for feeding the output of the generator means into the storage means comprising switching means for controlling the direction of the current fed from the generator means to the storage means, said switching means including control means operated by the output of the output control means to effect a flow of current in one direction following one particular output and a flow of current in the other direction following another particular output, an input, and a comparison circuit for controlling the output control means to effect said particular outputs respectively depending on the combined effects of said input and said storage means.

15. Apparatus for representing the magnitude of an electrical quantity by a series of sequential pulses in which each succeeding pulse represents a successively smaller portion of the total possible amplitude of the quantity which comprises, means for producing a reference potential, integrating means for storing charges the potential of which depends on the integrated effects of the charges fed to said integrating means, an input for receiving said electrical quantity, output control means for comparing the potential of the integrating means with said reference potential and controlling the output potential at particular times during said series in response to predetermined relative values of the compared potentials, a generator circuit for producing a decaying current, means feeding the input to the integrating means, and switching means for feeding the output of said generator circuit to said integrating means, said switching means including means for reversing the direction of current flow to said integrating means in response to predetermined changes in said output.

ALAN JOHN HENRY OXFORD.

REFERENCES CITED

The following references are of record in the file of this patent:

UNITED STATES PATENTS

| Number | Name | Date |
|---|---|---|
| 2,437,707 | Pierce | Mar. 16, 1948 |
| 2,449,467 | Goodall | Sept. 14, 1948 |
| 2,451,044 | Pierce | Oct. 12, 1948 |
| 2,464,607 | Pierce | Mar. 15, 1949 |